(12) United States Patent
Martin et al.

(10) Patent No.: US 7,125,448 B2
(45) Date of Patent: Oct. 24, 2006

(54) NON-AQUEOUS INK JET INK FOR IMAGING A LITHOGRAPHIC PRINTING PLATE

(75) Inventors: Thomas W. Martin, Rochester, NY (US); Michael J. McElligott, Rochester, NY (US)

(73) Assignee: Nu-Kote International, Inc., Franklin, TN (US)

( * ) Notice: Subject to any disclaimer, the term of this patent is extended or adjusted under 35 U.S.C. 154(b) by 2 days.

(21) Appl. No.: 10/955,525

(22) Filed: Sep. 30, 2004

(65) Prior Publication Data

US 2006/0065145 A1    Mar. 30, 2006

(51) Int. Cl.
*C09D 11/00* (2006.01)

(52) U.S. Cl. .............................. 106/31.58; 106/31.86; 106/31.43; 106/31.75

(58) Field of Classification Search ............. 106/31.58, 106/31.86, 31.43, 31.75
See application file for complete search history.

(56) References Cited

U.S. PATENT DOCUMENTS

| | | | | |
|---|---|---|---|---|
| 4,683,002 A | * | 7/1987 | Mirua et al. ............. | 106/31.32 |
| 4,732,613 A | * | 3/1988 | Shioya et al. ............. | 106/31.32 |
| 4,931,810 A | * | 6/1990 | Iwata et al. ................. | 346/111 |
| 5,059,246 A | * | 10/1991 | Yamamoto et al. ...... | 106/31.58 |
| 5,076,843 A | * | 12/1991 | Acitelli et al. ........... | 106/31.58 |
| 5,141,556 A | * | 8/1992 | Matrick ...................... | 524/385 |
| 5,312,654 A | | 5/1994 | Arimatsu et al. | |
| 5,501,150 A | | 3/1996 | Leenders et al. | |
| 5,738,013 A | | 4/1998 | Kellett | |
| 5,849,066 A | | 12/1998 | Kellett | |
| 5,922,117 A | * | 7/1999 | Malhotra et al. ........ | 106/31.58 |
| 5,925,176 A | * | 7/1999 | Rehman ................. | 106/31.43 |
| 5,971,535 A | | 10/1999 | Kellett | |
| 6,014,931 A | | 1/2000 | Fromson et al. | |
| 6,454,405 B1 | | 9/2002 | Stowe | |
| 6,523,472 B1 | | 2/2003 | Loccufier et al. | |
| 6,689,837 B1 | | 2/2004 | Matzinger | |
| 6,699,640 B1 | | 3/2004 | Verschueren et al. | |
| 2003/0177942 A1 | * | 9/2003 | Yamazaki ................ | 106/31.27 |

* cited by examiner

*Primary Examiner*—David Sample
*Assistant Examiner*—Veronica Faison-Gee
(74) *Attorney, Agent, or Firm*—Fay, Sharpe, Fagan, Minnich & McKee, LLP

(57) ABSTRACT

A non-aqueous ink jet ink for printing lithographic printing plates. The formulation provides for ink jet printing using a solvent based ink in a drop on demand printer. The ink exhibits excellent physical properties and good stability over a range of times and temperatures.

10 Claims, No Drawings

NON-AQUEOUS INK JET INK FOR IMAGING A LITHOGRAPHIC PRINTING PLATE

BACKGROUND

The present exemplary embodiment relates to a non-aqueous ink jet ink. It finds particular application in conjunction with the printing of offset and other lithographic master plates, and will be described with particular reference thereto. However, it is to be appreciated that the present exemplary embodiment is also amenable to other like applications.

Lithographic printing has long been the most widely used printing technique, especially for short to medium printing run lengths of 1,000 to 15,000. By the term "lithographic" is meant to include various terms used synonymously, such as offset, offset lithographic, wet lithographic, planographic, and others.

Lithography is the process of printing from specially prepared surfaces, some areas of which are capable of accepting lithographic ink, whereas other areas, will not accept the ink. The areas, which accept ink, form the printing image areas and the ink-rejecting areas form the background areas. In the art of photolithography, a photographic material is made image-wise receptive to oily or greasy ink in the photo-exposed (negative working) or in the non-exposed areas (positive working) on a hydrophilic background.

In the production of common lithographic plates, a support that has affinity to water or obtains such affinity by chemical treatment is coated with a thin layer of a photosensitive composition. Coatings for that purpose include light-sensitive polymer layers containing diazo compounds, dichromate-sensitized hydrophilic colloids and a large variety of synthetic photopolymers. Particularly diazo-sensitized systems are widely used. Upon image-wise exposure of the light-sensitive layer the exposed image areas become insoluble and the unexposed areas remain soluble. The plate is then developed with a suitable liquid to remove the diazonium salt or diazo resin in the unexposed areas.

To make a typical lithographic printing plate, a substrate is provided with a hydrophilic surface which is imaged with an oleophilic material corresponding to the pattern to be printed. The oleophilic material is typically a photosensitive photopolymer or diazo resin which is exposed to light by masking with a film negative. The exposed portions are rendered insoluble in a developer and the unexposed portions remain soluble. Insolubility is typically caused by cross-linking of the photopolymer, the rate of cross-linking enhanced by coating the photopolymer with an oxygen inhibition layer. After exposure the oxygen inhibition layer and the unexposed photopolymer are removed. Other negative working materials useful in this invention include diazo resins mixed with non-photosensitive polymers and resins.

The above described process is referred to as a negative working process because the unexposed material is removed. In a positive working process, the pattern to be printed is masked and the photosensitive exposed material is rendered soluble in a developer. Printing plates made according to either process are used on offset presses.

Presently, most offset printing plates are prepared by analog prepress techniques. Photo type-setters and conventional cameras containing silver halide paper and film generate positive texts and photographs which are eventually converted to film negatives for plate preparation. This process is labor intensive and costly. The computer has now made it possible to convert this prepress operation from an analog process to a digital process, thus eliminating substantial labor and raw material costs. Total digitization of information also makes it possible to eliminate the film negative step in plate preparation and go directly to the plate. There are several means of digitally imaging a plate directly. Two of the most promising methods use lasers or ink jet technology. Using lasers to image plates directly is very costly because of the sophisticated optics and their controls. Time is also a constraint with lasers because of the necessity for raster scanning. A further drawback to laser imaging is the need for expensive, high-speed plate coatings, most of which are commercially unproven.

Ink jet printing technology is much simpler and more cost effective. No optical beam deflectors or focusing optics are necessary. Ink jet heads can be easily integrated so that imaging time is minimized. The coatings on the offset plates needed in an ink jet plate maker can be standard negative working photopolymers with proven track records. High sensitivity silver halide coatings are not necessary.

In recent years, ink jet printers have replaced laser printers as the most popular hard copy output printers for computers. Some of the competitive advantages of ink jet printers have been low cost, reliability, and the ability to make color images without significantly increasing the cost of the printer. Both thermal ink jet and piezoelectric ink jet printing methods have been widely adopted for desktop computer printing. A third conventional type of ink jet printing, a continuous flow type method, has found acceptance in high quality color printing and proofing in graphics applications.

In light of the increased use of ink jet printers for producing lithographic printing plates, there is a continued need for durable, waterfast, and bleed resistant inks for use in such printers. More particularly, there is a continued need for a non-aqueous hydrophobic inks for use in the printing of lithographic printing plates.

BRIEF DESCRIPTION

In accordance with one aspect of the present exemplary embodiment, there is provided a non-aqueous ink for use in the printing of lithographic plates, said ink comprising propanol, butanol, pyrrolidone and a solvent soluble dye.

In accordance with a second aspect, there is provided a method of preparing a master offset printing plate comprising the steps of: providing a lithographic receiving support; coating the receiving support with a curable polymer composition, wherein the composition is hydrophilic when uncrosslinked and hydrophobic when crosslinked; printing an image on the curable polymer composition using ink deposited from an ink jet printer, the ink comprising propanol, butanol, pyrrolidone and a coloring agent; crosslinking those portions of the curable polymer composition that are not contacted by the ink, thereby rendering such portions hydrophobic; and removing the ink from the lithographic receiving support.

In accordance with a third aspect, there is provided a method of offset printing comprising the steps of: providing a lithographic receiving support with a hydrophilic polyester receiving layer; printing an image on the receiving layer using a hydrophobic non-aqeuous ink deposited from an ink jet printer, the ink comprising propanol, butanol, pyrrolidone and a coloring agent; applying an aqueous ink to the receiving layer to deposit on portions of the receiving layer not containing the image; removing the non-aqueous ink from the receiving layer; and contacting the receiving support with a printing substrate.

DETAILED DESCRIPTION

In one aspect, there is provided a novel non-aqueous ink jet fluid material including a non-aqueous solvent carrier and at least one coloring agent, such as a dye or pigment component. By the term "non-aqueous", applicants mean that the ink-jet fluid has less than about 3.0% water by weight. In one embodiment, the ink-jet fluid has less than 1.0% and more preferably, less than 0.1% water. The liquid carrier is preferably an organic solvent or combination thereof. Choice of the specific liquid carrier depends on the specific ink jet printer and its compatible ink jet printing head and cartridge being used for the ink jet printing. Compatibility with both the ink jet hardware and with the reactive component is important in the selection of the liquid carrier.

In one embodiment, the solvent carrier includes a blend of propanol, butanol, pyrrolidone, and diacetone alcohol. Preferably, the propanol is 1-propanol, the butanol is 1-butanol, and the pyrrolidone is 2-pyrrolidone. The amounts of each component in the solvent carrier may vary depending on the characteristics desired in the final ink composition as well as the requirements of the ink jet printer in which the ink will be used. Preferably, the liquid carrier will include from about 20 to about 75% by weight propanol, from about 3 to about 35% butanol, from about 3 to about 35% pyrrolidone, and from about 2 to about 25% diacetone alcohol. More preferably, in one embodiment, the liquid carrier will include from about 50 to about 60% by weight propanol, from about 10 to about 20% butanol, from about 10 to about 20% pyrrolidone, and from about 5 to about 20% diacetone alcohol.

The coloring agent of the present invention is preferably an organic dye, although any other coloring agent suitable for use in piezoelectric ink-jet printing inks may also be used. Many dyes and pigments are known to be suited for ink jet technology. Suitable dyes may be selected based on their compatibility in the non-aqueous liquid carrier. In one preferred embodiment, the coloring agent is a nigrosine type (acid black) dye. Such dyes are known in the art. The amount of coloring agent will depend on its identity as well as the requirements of the printing system. In one embodiment, a preferred amount of nigrosine dye for use in the ink-jet ink is from 0.5 to 10% by weight, more preferably from 1.0 to 5.0% by weight.

Other components may also be used in the ink jet ink of the present invention. A preferred durability enhancing component that may be added to the ink is ethyl cellulose. Other components that may be included in the ink include a biocide to prevent unwanted microbial growth, as well as thickeners, pH adjusters, buffers, conductivity enhancing agents, drying agents, and defoamers. The use of buffers and solubilizers is effective to improve the solubility or dispersibility of the dye. The addition of defoaming agents and foam suppressing agents are also possible to suppress foaming of the ink composition in the ink jet nozzle.

The above ink may be used in a number of different ink jet printing systems. Excellent results are realized in a piezoelectric "drop on demand" printing system and the exemplary embodiments discussed herein will be with reference to such a system. Nevertheless, the above ink may be used in any known ink jet printing system, including thermal, bubble jet and continuous ink jet systems.

In general, the piezoelectric and continuous flow types of ink jet printheads have a wider latitude of acceptable liquid carriers than the thermal or bubble type of ink jet printhead. For example, piezoelectric ink jet printheads work acceptably with various non-aqueous or organic liquid carriers while thermal ink jet printheads typically need a high percentage of water or volatile organic solvent in the liquid carrier.

In one exemplary embodiment, the above non-aqueous ink is used in a piezoelectric ink jet printing system to print onto offset printing plates. By the term "lithographic" is meant to include various terms used synonymously, such as offset, offset lithographic, wet lithographic, planographic, and others.

The ink may be printed onto a lithographic receiving support. Although the support for the ink of this invention can be selected from a wide range of materials commonly used in lithographic printing plates with a basic requirement that the media with this support be capable of transport through the ink jet printing hardware where the media is required to be transported, the preferred supports are paper, plastic polymer film, metal or composite sheets or foils. Preferably, a support having a metallic surface is used. Metals such as aluminum, magnesium, zinc, chromium, iron, nickel and their alloys are preferable due to their dimensional stability and durability. Use of an aluminum plate is preferred since it gives a good hydrophilic property and water retention property upon printing. When an aluminum plate is used for the substrate, it is preferable to subject the plate to a graining treatment by using an appropriate method such as mechanical methods like ball polishing or brush polishing, chemical methods like etching with a solution containing an acid, or electrochemical methods like etching by electrolysis, followed by an anodizing treatment or a treatment with sodium silicate.

The media of the present invention is for use with the ink jet fluid marking material of the present invention and comprises a support that has a receiving layer containing at least one hydrophilic material, which is preferably a hydrophilic polymer. The selection of this hydrophilic material is made based on its performance in three main areas: receptivity to the present inventive ink jet ink marking material to provide a high quality image with the desired resolution, amount, and uniformity; interaction with the ink to provide a durable image; and the hydrophilic properties and water-fastness properties needed for high quality lithographic printing. For example, most aqueous-based ink jet fluids need a hydrophilic receiving surface for good image quality. The hydrophilic properties and water-fastness needed in lithographic printing are well known in the art.

Preferred hydrophilic materials in the present invention are polyvinyl alcohols and copolymers thereof, cellulosic polymers, polyvinyl acetates and copolymers thereof, polyacrylates and copolymers thereof, polymethacrylates and copolymers thereof, polymaleic anhydrides and derivatives and copolymers thereof, polyvinyl acetals and copolymers thereof, polyvinyl pyrrolidones and copolymers thereof, polyamides, or inorganic polymers. In a most preferred embodiment, the hydrophilic material contains a polyester.

In one embodiment, the ink is printed onto a plate coated with a second, curable polymer composition and post processed to form a master plate for offset printing. The polymer composition is a curable (i.e. crosslinkable) polymer that has an initial affinity for an aqueous printing ink (i.e. is hydrophilic) and is changeable to a hydrophobic composition when crosslinked. Such polymer coatings for lithographic plates are known in the art.

In this embodiment, the ink is printed onto the coated sheet to form an image. The sheet is then subjected to conditions to cross-link the curable layer. These conditions will vary depending on the identity of the curable polymer layer, but in a preferred embodiment where the curable polymer is UV curable, the appropriate conditions include the application of UV radiation. Thus, after the ink jet fluid marking material of the present invention is printed on the coated substrate, the curable polymeric layer is crosslinked by exposure to an external energy source or other suitable means. If the curable polymeric layer is a non-radiation curable reactive composition of the present invention, the preferred external energy source is heat. In a more preferred embodiment, the polymeric layer is a radiation curable reactive composition, the preferred external energy source is the radiation, such as ultraviolet radiation, to which the material is most efficiently sensitive. For some non-radiation curable polymeric components such as some isocyanates, ambient conditions are sufficient means to provide an effective reaction.

The image printed using the above ink acts as a masking layer, preventing the areas of the curable polymer layer on which it is printed from crosslinking. The exposed areas of the curable polymer layer will crosslink and become hydrophobic, while the non-crosslinked areas remain hydrophilic. This forms an effective amount of an oleophilic and water-insoluble pattern on the lithographic plate blank, thereby preparing it for high quality lithographic printing. The inventive ink is then removed from the plate, creating a master plate for a lithographic printing process using an aqueous ink for printing. A subsequent lithographic printing process using a conventional aqueous ink will deposit the aqueous ink on the hydrophilic areas of the plate, which is subsequently contacted with a printing substrate, such as paper.

In one preferred embodiment, the curable polymer may be an acrylic polymer. A preferred acrylic polymer is a copolymer with an organophosphorus compound. As used herein, the phrase "organophosphorus compound" includes organophosphoric acids, organophosphonic acids, organophosphinic acids, as well as various salts, esters, partial salts, and partial esters thereof. The organophosphorus compound may be copolymerized with acrylic acid or methacrylic acid. Copolymers of vinyl phosphonic acid are preferred, especially copolymers containing about 5–50 mole % vinyl phosphonic acid and about 50–95 mole % acrylic acid and having a molecular weight of about 20,000–100,000 prior to crosslinking. Copolymers containing about 70 mole % acrylic acid groups and about 30 mole % vinylphosphonic acid groups are particularly preferred. The curable polymer may be applied in batch processing of sheet or in coil processing by conventional coating processes including roll coating, powder coating, spray coating, vacuum coating, emulsion coating or immersion coating. Preferably, the curable polymer is applied by roll coating, typically to a thickness of about 0.01–1.0 mil, preferably about 0.1–0.3 mil.

The receiving layer of the media may also contain a catalyst to increase the rate of reaction of the curable polymer component after printing and upon exposure to the external energy source or other suitable means to cause reaction.

In a second embodiment, the inventive ink is used to create a negative master plate for use in a lithographic printing process. In this embodiment, the ink is printed onto a polyester coated plate that does not contain an emulsion layer. The printed areas, due to non-aqueous nature of the inventive ink, are hydrophobic while the unprinted polyester areas of the plate remain hydrophilic. This creates a negative master plate where traditional aqueous inks in a lithographic process adhere to the polyester while not adhering to the printed areas.

The invention will now be more fully explained by the following examples. However, the scope of the invention is not intended to be limited to these examples.

EXAMPLE 1

Several formulations were prepared according to the present embodiments. These formulations are outlined in Table 1. The values are in weight percent.

TABLE 1

| Component | Formulation 1 | Formulation 2 | Formulation 3 |
|---|---|---|---|
| 1-propanol | 56.0 | 56.0 | 58.4 |
| 1-butanol | 15.0 | 15.0 | 14.1 |
| 2-pyrrolidone | 15.0 | 15.0 | 14.1 |
| Diacetone alcohol | 12.0 | 12.0 | 11.25 |
| Nigrosine | 2.0 | 2.0 | 1.5 |
| Ethylcellulose | 0 | 0.75 | 0.65 |

The ink physical properties for these formulations are summarized in Table 2.

TABLE 2

| Ink | Surface tension (dyne/cm) | Viscosity (cP) | Conductivity (mS/cm) | pH |
|---|---|---|---|---|
| 1 | 44.0 | 2.49 | 0.060 | 7.61 |
| 2 | 35.0 | 4.21 | 0.070 | 7.06 |
| 3 | 42.0 | 4.94 | 0.060 | 6.77 |

Cartridges for use in an Epson 980 printer were emptied, cleaned and then charged with the inks. The cartridges were then taped shut and placed in the cartridge holder of an EPSON ink jet printer, a piezoelectric type desktop ink jet printer. Prints were made on plain paper, a plate coated with UV sensitive emulsion and an uncoated plate. The printing pattern was a solid bar area/text. The solid areas printed uniformly on Spinx 20# plain copier paper and the text was crisp and sharp. The printing quality of the inks on the coated and uncoated plates was lower, but still acceptable in most instances.

A typical ink was subjected to natural or accelerated aging tests by being kept at 21° C. for 10 days or 50° C. for 10 days. The physical properties of the ink after this aging are summarized in Table 3. By comparing the data of fresh and aged ink, it can be seen that the physical properties of the inks changed little with time and temperature, indicating that the ink exhibits good stability.

TABLE 3

| Ink Formulation | Surface tension (dyne/cm) | Viscosity (cP) | Conductivity (mS/cm) | pH |
|---|---|---|---|---|
| 2 Fresh | 35.0 | 4.21 | 0.070 | 7.06 |
| 2 10 days @ 21° C. | 34.0 | 4.55 | 0.070 | 6.42 |
| 2 10 days @ 50° C. | 32.0 | 4.17 | 0.070 | 6.23 |

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A non-aqueous ink for use in the printing of lithographic plates, said ink comprising propanol, butanol, pyrrolidone, diacetone alcohol and a coloring agent.

2. A non-aqueous ink according to claim 1, wherein said ink comprises less than 1.0% water by weight.

3. A non-aqueous ink according to claim 2, wherein said ink comprises less than 0.1% water by weight.

4. A non-aqueous ink according to claim 1, wherein said propanol is 1-propanol.

5. A non-aqueous ink according to claim 1, wherein said butanol is 1-butanol.

6. A non-aqueous ink according to claim 1, wherein said pyrrolidone is 2-pyrrolidone.

7. A non-aqueous ink according to claim 1, wherein said ink comprises include from about 20 to about 75% by weight propanol, from about 3 to about 35% butanol, from about 3 to about 35% pyrrolidone, and from about 2 to about 25% diacetone alcohol.

8. A non-aqueous ink according to claim 1, wherein said coloring agent is a soluble dye.

9. A non-aqueous ink according to claim 8, wherein said soluble dye is a nigrosine dye.

10. A non-aqueous ink according to claim 1, further comprising one or more of a durability enhancing component, a biocide, thickeners, pH adjusters, buffers, conductivity enhancing agents, drying agents, and defoamers.

* * * * *